(12) United States Patent
Yamada

(10) Patent No.: US 10,645,042 B2
(45) Date of Patent: May 5, 2020

(54) INFORMATION PROCESSING APPARATUS, METHOD AND MEDIUM

(71) Applicant: Evrika Inc., Tokyo (JP)

(72) Inventor: Naoki Yamada, Tokyo (JP)

(73) Assignee: EVRIKA INC., Tokyo (JP)

( * ) Notice: Subject to any disclaimer, the term of this patent is extended or adjusted under 35 U.S.C. 154(b) by 135 days.

(21) Appl. No.: 15/811,512

(22) Filed: Nov. 13, 2017

(65) Prior Publication Data

US 2018/0139159 A1    May 17, 2018

(30) Foreign Application Priority Data

Nov. 15, 2016    (JP) ................................. 2016-222515

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |

(52) U.S. Cl.
CPC .......... *H04L 51/066* (2013.01); *H04L 67/145* (2013.01); *H04L 67/2828* (2013.01); *H04L 29/06* (2013.01); *H04L 69/04* (2013.01)

(58) Field of Classification Search
CPC .... H04L 51/066; H04L 67/2828; H04L 69/04
See application file for complete search history.

(56) References Cited

U.S. PATENT DOCUMENTS

| | | | |
|---|---|---|---|
| 6,785,732 B1* | 8/2004 | Bates .................... | G06F 21/56 709/232 |
| 2003/0140112 A1* | 7/2003 | Ramachandran ....... | H04L 51/28 709/217 |
| 2004/0186894 A1* | 9/2004 | Jhingan ................ | G06Q 10/107 709/207 |
| 2009/0216845 A1* | 8/2009 | Giszczak ................ | H04L 51/14 709/206 |
| 2010/0042693 A1* | 2/2010 | Eriksson ................. | H04L 51/24 709/206 |
| 2010/0306329 A1* | 12/2010 | Kinoshita ............. | H04L 51/066 709/206 |

(Continued)

FOREIGN PATENT DOCUMENTS

| | | |
|---|---|---|
| JP | 2010278484 A | 12/2010 |
| JP | 2016163162 A | 9/2016 |

*Primary Examiner* — Oleg Survillo
(74) *Attorney, Agent, or Firm* — Ladas & Parry, LLP

(57) ABSTRACT

Provided is an information processing apparatus including: a request acquiring unit that acquires a data request message transmitted from a client to a server; a configuration information acquiring unit that acquires, from the server configuration information relating to a data set including a request target data; a response acquiring unit that acquires, in place of the client, a response message transmitted from the server and including data and configuration information relating to the data; a configuration information changing unit that changes the configuration information, with consistency therebetween being maintained; a data changing unit that changes the data so as to match the configuration information relating to the data after the change; and a data transmitting unit that transmits, to the client, a response message including the data after the change and the configuration information after the change, as a response to the data request message.

11 Claims, 6 Drawing Sheets

(56) References Cited

U.S. PATENT DOCUMENTS

| | | | |
|---|---|---|---|
| 2013/0290079 A1* | 10/2013 | Chavan | G06Q 30/0251 705/14.4 |
| 2014/0164529 A1* | 6/2014 | Kleppmann | H04L 51/32 709/206 |
| 2016/0112356 A1* | 4/2016 | Zheng | H04L 51/066 709/206 |
| 2016/0255176 A1 | 9/2016 | Yamada | |

* cited by examiner

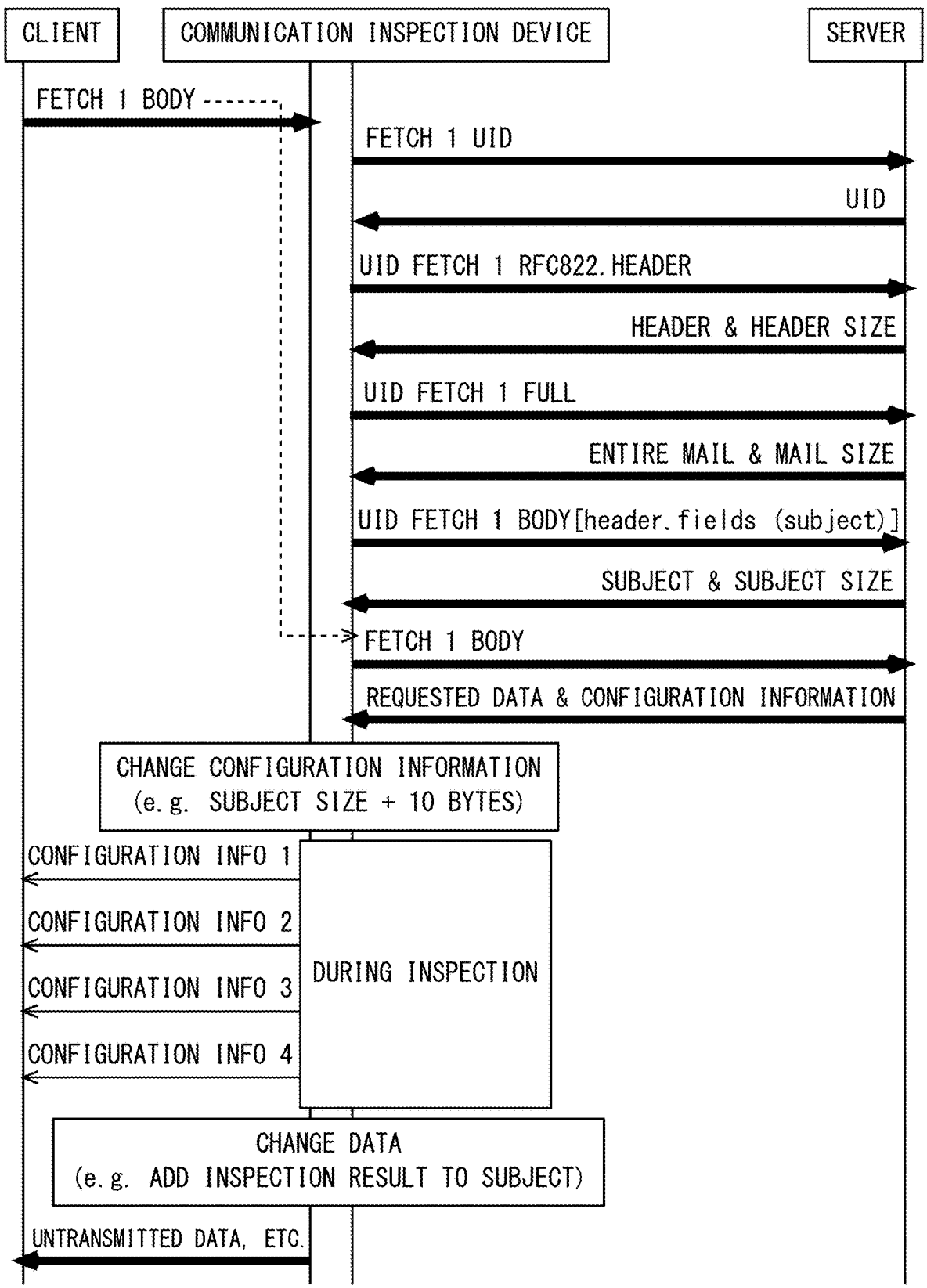

INFORMATION PROCESSING APPARATUS, METHOD AND MEDIUM

CROSS-REFERENCE TO RELATED APPLICATION

This application is based upon and claims the benefit of priority of the prior Japanese Patent Application No. JP2016-222515, filed on Nov. 15, 2016, the entire contents of which are incorporated herein by reference.

FIELD

The present disclosure relates to a technique to change data on a network.

BACKGROUND

In a system in which a relay device for relaying the transfer of e-mail (SMTP communication) and the acquisition of e-mail (Internet Message Access Protocol (IMAP) communication) is installed in a carrier facility network, a following technique was proposed. The relay device compresses e-mail, including a header, transferred from an e-mail transfer server, encapsulates the compressed e-mail with attaching a new header, and transfers the encapsulated e-mail to an IMAP server as compressed e-mail. When an e-mail acquisition request is received from a communication terminal, the relay device decapsulates the compressed e-mail acquired from the IMAP server, decompresses the compressed e-mail, and sends the decompressed e-mail to the communication terminal. Here the relay device changes the parameters, such as the e-mail size, so that compression and decompression of the e-mail do not bring inconsistency among various IMAP commands (see Japanese Patent Application Publication No. 2010-278484).

Another related art of the disclosure that was proposed is an information processing apparatus, having: a data acquiring unit that acquires data, which flows through a network and includes a header and content, before the data reaches a destination; an inspecting unit that inspects the content; an inspection-time transmitting unit that transmits at least a part of the data to the destination while the inspecting unit is performing inspection; and a transfer unit that transfers the data, excluding the portion already transmitted by the inspection-time transmitting unit to the destination after the inspecting unit completed the inspection of the content of the data (see Japanese Patent Application Publication No. 2016-163162).

SUMMARY

An example of the disclosure is an information processing apparatus, having: a request acquiring unit that acquires a data request message transmitted from a client to a server; a configuration information acquiring unit that acquires, from the server, configuration information relating to a data set including a target data requested by the data request message; a response acquiring unit that acquires, in place of the client, a response message transmitted from the server and including data and configuration information relating to the data; a configuration information changing unit that changes the configuration information relating to the data set and configuration information relating to the data, with consistency therebetween being maintained; a data changing unit that changes the data so as to match the configuration information relating to the data after the change performed by the configuration information changing unit; and a data transmitting unit that transmits, to the client, a response message including the data after the change performed by the data changing unit and the configuration information relating to the data after the change performed by the configuration information changing unit, as a response to the data request message transmitted from the client to the server.

The present disclosure can be understood as an information processing apparatus, system, method executed by a computer, or a program causing a computer to execute the method.

The present disclosure can also be understood as a recording medium from which a computer, a device, a machine or the like can read such a program.

Here the recording medium, which can be read by a computer or the like, is a recording medium which stores such information as data and programs by an electric, magnetic, optical, mechanical or chemical function, and which can be read by a computer or the like.

BRIEF DESCRIPTION OF THE DRAWINGS

FIG. 6 is a diagram depicting a flow of communication when the message processing is executed according to the embodiment.

DESCRIPTION OF EMBODIMENTS

Embodiments of an information processing apparatus, a method and a program according to this disclosure will be described with reference to the drawings.

The following embodiments, however, are examples and are not intended to limit the information processing apparatus, the method and the program according to this disclosure to the concrete configurations described below. To carry out the disclosure, an appropriate concrete configuration may be used, and various improvements and modifications may be performed on the embodiments described below.

In these embodiments, a case when the information processing apparatus, the method, and the program according to this disclosure are applied to a communication inspection device, will be described. However, the information processing apparatus, the method and the program according to this disclosure can be widely used for techniques to change data on a network, and the targets to which this disclosure can be applied are not limited to the examples described in these embodiments.

System Configuration

Figure 1:
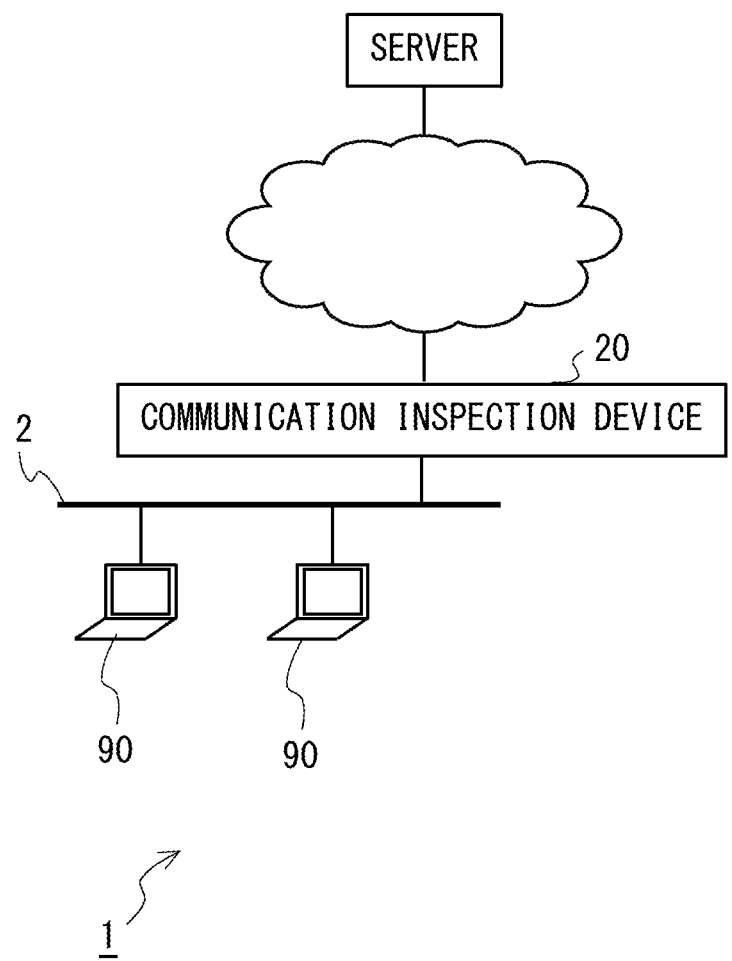
FIG. 1 is a schematic diagram depicting a configuration of a system according to an embodiment.

FIG. 1 is a schematic diagram depicting a configuration of a system 1 according to this embodiment. The system 1 of this embodiment includes: a network segment 2 to which a plurality of information processing terminals 90 (hereafter called "client(s) 90") are connected; and a communication inspection device 20 configured to relay communication related to the clients 90. Each of the clients 90 in the network segment 2 can communicate with various servers which are connected at remote areas via the Internet or a wide area network (WAN) using the communication inspection device 20. In this embodiment, the communication inspection device 20 is connected between the clients 90 and Internet in the network segment 2, so as to acquire a transmitted message. Among the acquired messages, the communication inspection device 20 transfers a message that is not an inspection target, and a message that is allowed to be transferred based on the result of the inspection.

Figure 2:
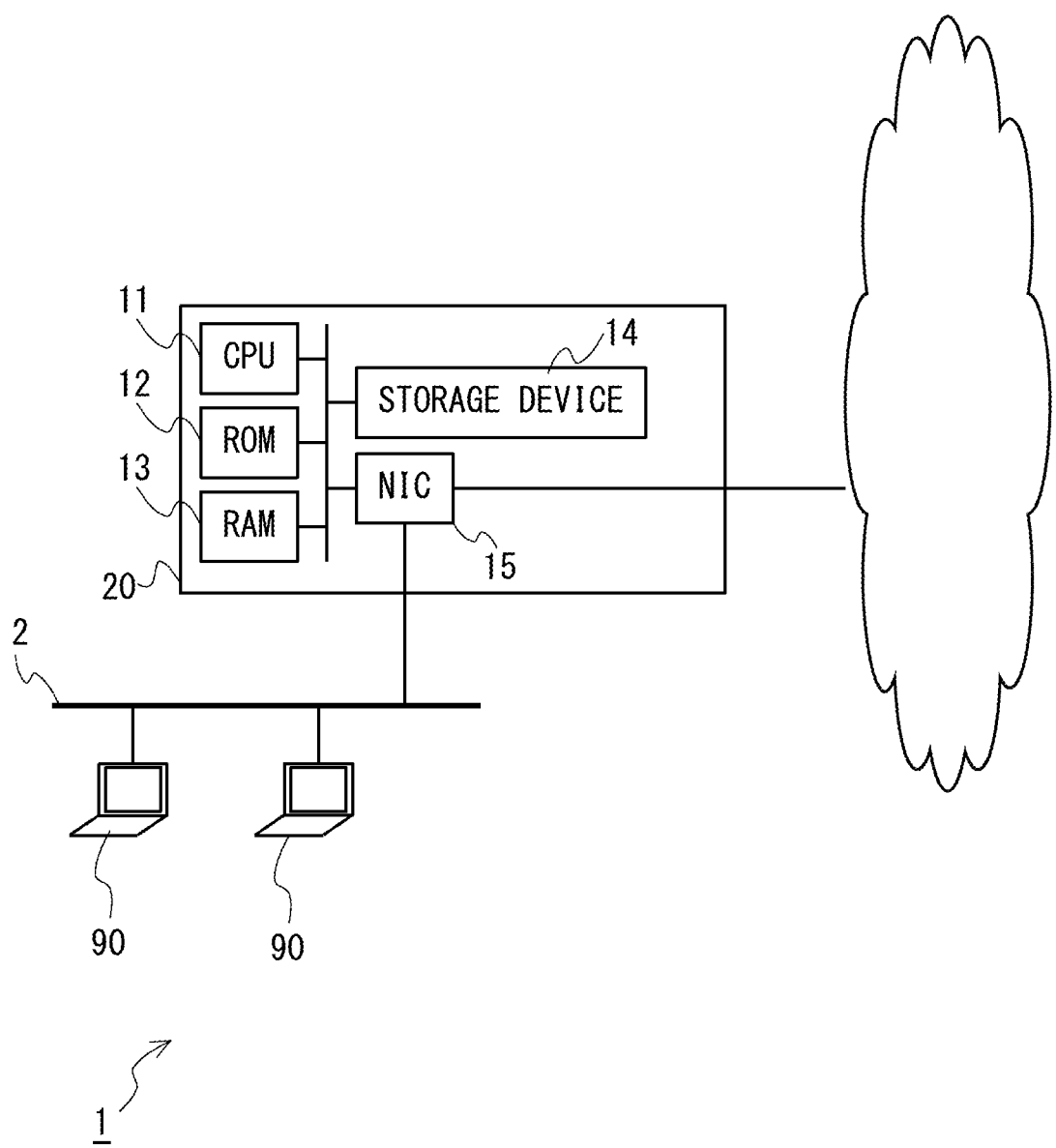
FIG. 2 is a diagram depicting a hardware configuration of a communication inspection device according to the embodiment.

FIG. 2 is a diagram depicting a hardware configuration of the communication inspection device 20 according to this embodiment. The communication inspection device 20 is a computer which includes a central processing unit (CPU) 11, a read only memory (ROM) 12, a random access memory (RAM) 13, a storage device 14, such as an electrically erasable and programmable read only memory (EEPROM) and a hard disk drive (HDD), and a communication unit, such as a network interface card (NIC) 15. For the actual hardware configuration of the communication inspection device 20, composing elements may be omitted, replaced or added appropriately in accordance with the embodiment. The communication inspection device 20 is not limited to a single device. The communication inspection device 20 may be implemented by a plurality of devices using a cloud, distributed computing technology or the like.

Figure 3:
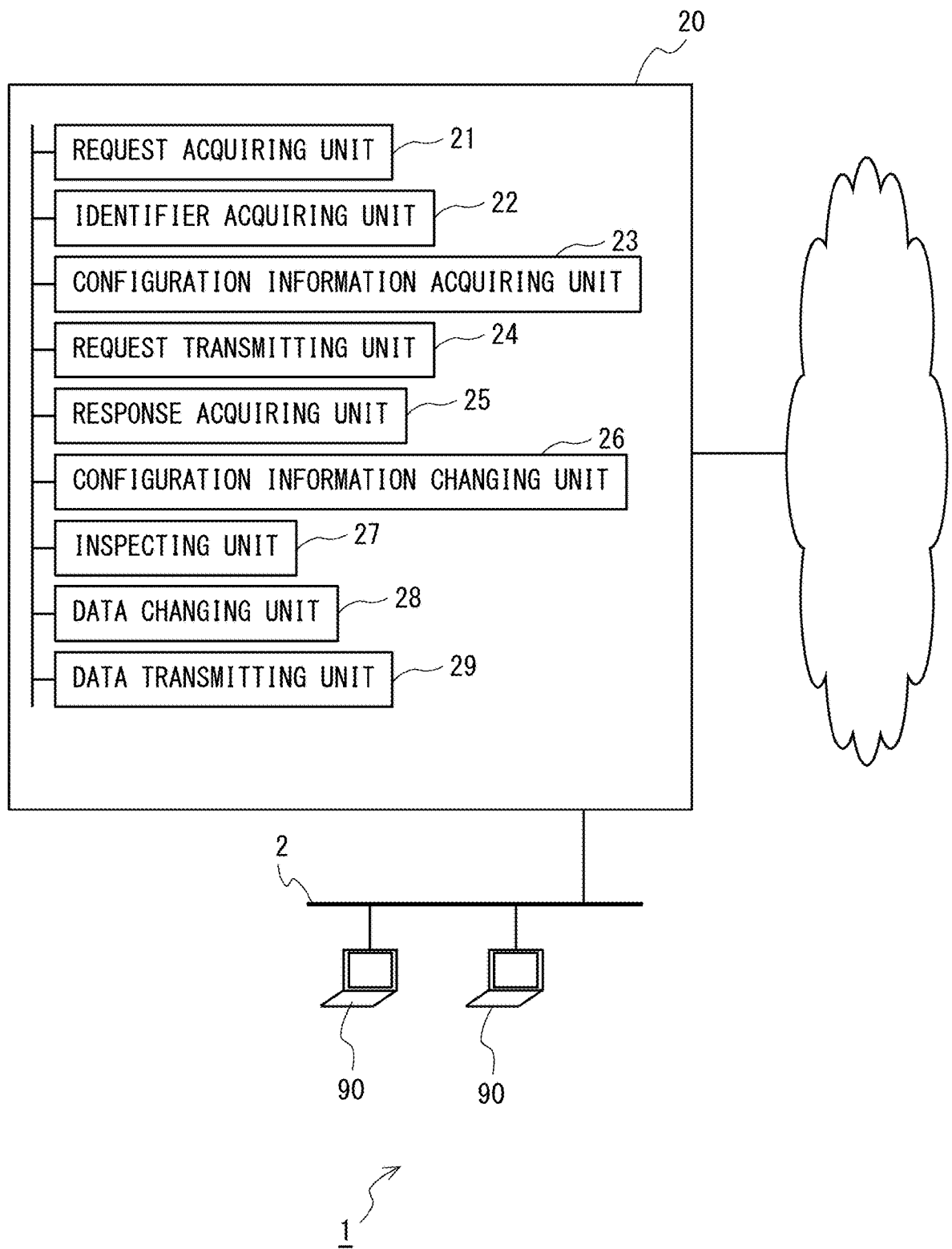
FIG. 3 is a schematic diagram depicting a functional configuration of the communication inspection device according to the embodiment.

FIG. 3 is a schematic diagram depicting a functional configuration of the communication inspection device 20 according to this embodiment. The communication inspection device 20 functions as an information processing apparatus, including a request acquiring unit 21, an identifier acquiring unit 22, a configuration information acquiring unit 23, a request transmitting unit 24, a response acquiring unit 25, a configuration information changing unit 26, an inspecting unit 27, a data changing unit 28 and a data transmitting unit 29, by a program which is recorded in the storage device 14, is read to the RAM 13, and is executed by the CPU 11. In this embodiment, each function of the communication inspection device 20 is executed by the CPU 11, which is a general purpose processor, but a part or all of these functions may be executed by one or a plurality of dedicated processors. Further, a part or all of these functions may be executed by a device installed at a remote area or by a plurality of distributed devices, using cloud technology or the like.

The request acquiring unit 21 acquires a data request message which was transmitted from a client 90 to a server. By detecting a packet of which at least one of a transmission source, a destination and a protocol type matches with a predetermined condition, the request acquiring unit 21 acquires a desired data request message. This embodiment described a case of acquiring a FETCH message using IMAP as the data request message transmitted from the client 90 to the server. However, as mentioned above, the application range of the technique according to this disclosure is not limited to the examples of this embodiment. The technique according to this disclosure is suitably applied to communication using a protocol in which information to determine the configuration of the data is transmitted/received with the data.

When the data request message is a message which does not specify an identifier (UID in the case of IMAP) unique to the data set (one entire e-mail in the case of IMAP), including the target data of the request, the identifier acquiring unit 22 acquires the identifier of this data set from the server. In the case of IMAP, for example, there are two types of a FETCH message, which is a data request message: a message in which the UID is specified or a message in which the UID is not specified. If the UID is not specified, and only an e-mail number (an identifier which is effective only within a same session) is specified in a FETCH message received from the client 90, the identifier acquiring unit 22 inquires the UID of this e-mail (data set to the server) by specifying this e-mail number in this session, so as to acquire the UID of the data set (entire e-mail) including the target data (a part or all of the e-mail in this embodiment, such as HEADER, SUBJECT and BODY of the e-mail).

When the request acquiring unit 21 acquires the data request message, the configuration information acquiring unit 23 acquires, from the server, the configuration information relating to the data set (configuration information of the entire e-mail in the case of IMAP), including the target data requested by the data request message. In this case, the configuration information acquiring unit 23 specifies an identifier unique to the data set, which includes the target data, and acquires the configuration information relating to the data set from the server. The identifier specified here may be an identifier specified by the client 90 in the data request message, or may be an identifier acquired by the identifier acquiring unit 22.

After the request acquiring unit 21 acquires the data request message, the request transmitting unit 24 transmits, in place of the client 90, the data request message to the server. In other words, in this embodiment, the communication inspection device 20 operates as a kind of proxy between the client 90 and the server, and in place of the client 90, the request transmitting unit 24 transmits to the server the data request message from the client 90 addressed to the server.

In place of the client 90, the response acquiring unit 25 acquires the response message, which was transmitted from the server responding to the data request message transmitted from the request transmitting unit 24, and includes the data and the configuration information relating to the data, before the response message reaches the destination (client 90).

The configuration information changing unit 26 changes the configuration information relating to the data set and the configuration of the data, with the consistency therebetween being maintained. For example, the configuration information changing unit 26 makes a change to increase the size information relating to the data, in the configuration information relating to the data, by a predetermined amount (e.g. increase the size information relating to the SUBJECT of the e-mail by 10 bytes), and then make a change to adjust the configuration information relating to the data set in accordance with the increased size of the data (e.g. increase the size information of the entire e-mail by 10 bytes).

The inspecting unit 27 inspects whether the data acquired by the response acquiring unit 25 is data of which transfer to the client 90 is allowed, in accordance with the predetermined inspection items. For example, the inspecting unit 27 inspects whether malware is included in the content, whether an undesirable expression is included in the content and the like. For the inspection method, pattern matching, a hash method or the like can be used. In the inspection according to this disclosure, however, the concrete inspection items and inspection methods that can be used are not limited to the examples described in this embodiment. For the concrete inspection items and inspection methods, various inspection items and inspection methods, which are currently available or which will be developed in future, may be used.

The data changing unit 28 changes data based on the inspection result acquired by the inspecting unit 27. For example, the data changing unit 28 makes a change so that information, to notify the inspection result to the user, is added to the data (e.g. adding a character string to indicate the inspection result to the SUBJECT of the e-mail), or makes a change to make the data harmless when the inspection result indicates that the data is harmful and transfer of the data to the client 90 is not allowed. The phrase "to make the data harmless" refers for example to a processing to replace a part or all of the data with data which the client 90 is allowed to receive.

After changing data, the data changing unit 28 changes the data so as to match with the configuration information relating to the data changed by the configuration information changing unit 26. For example, when the configuration information changing unit 26 made a change to increase the size information relating to the data, the data changing unit 28 makes a change to add the information relating to the data the amount of increased size to the data.

As a response to the data request message transmitted from the client 90 to the server, the data transmitting unit 29 transmits, to the client 90, the response message including the data changed by the data changing unit 28, and the configuration information changed by the configuration information changing unit 26. While the inspecting unit 27 is performing the inspection, the data transmitting unit 29 transmits at least a part of the configuration information after the change to the client 90 at intervals which do not cause a timeout of the data reception wait time in the client 90. Then after the inspecting unit 27 completes the inspection of the data, the data transmitting unit 29 transmits the untransmitted portion of the data to the client 90.

Processing Flow

A flow of the processing executed by the system 1 according to this embodiment will be described next, with reference to a flow chart. The concrete content and sequence of processing depicted in the following flow chart are an example of carrying out this disclosure. The concrete content and sequence of processing may be appropriately selected in accordance with the embodiment of the disclosure.

Figure 4:
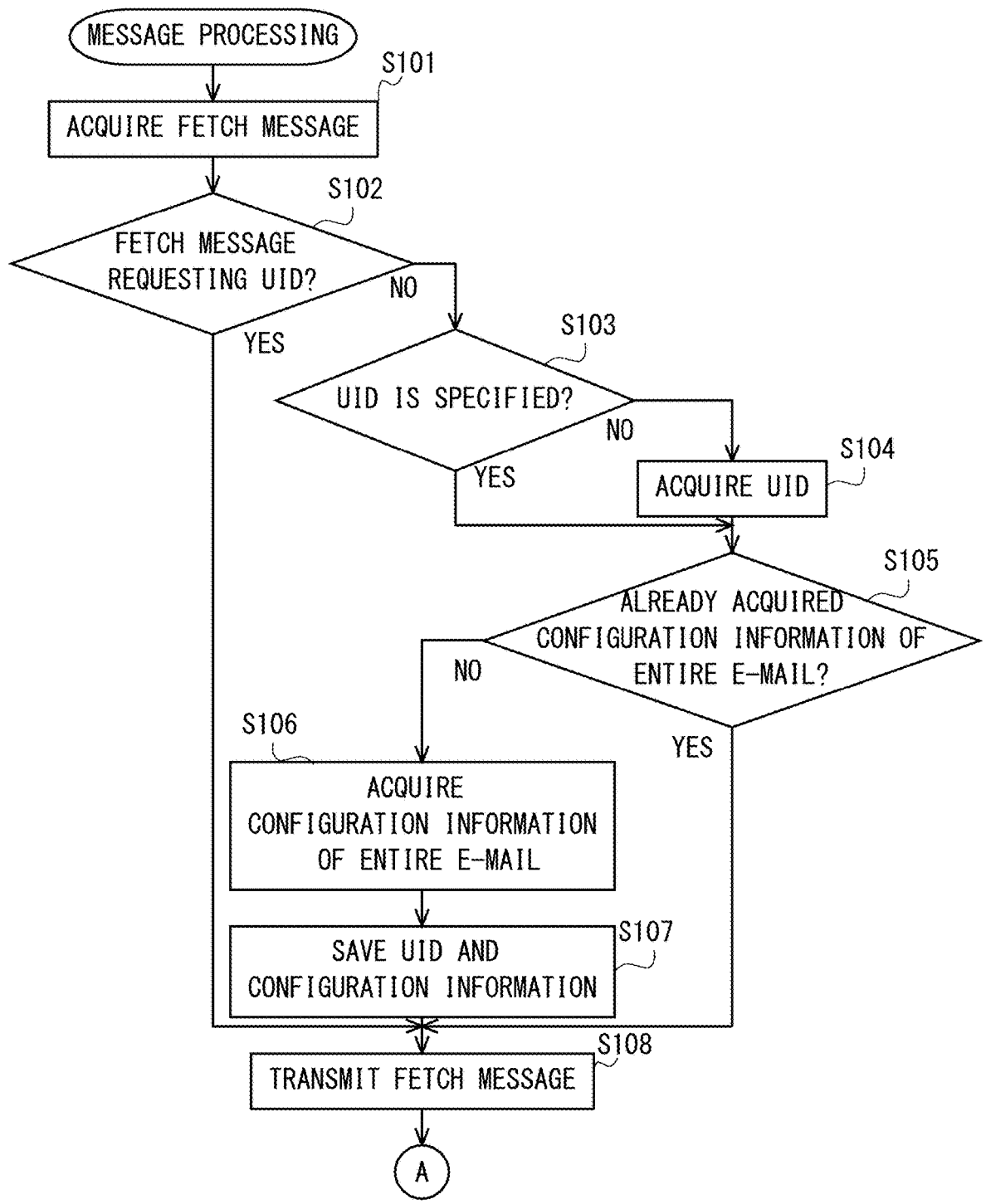
FIG. 4 is a flowchart (1) depicting a general flow of the message processing according to the embodiment.
Figure 5:
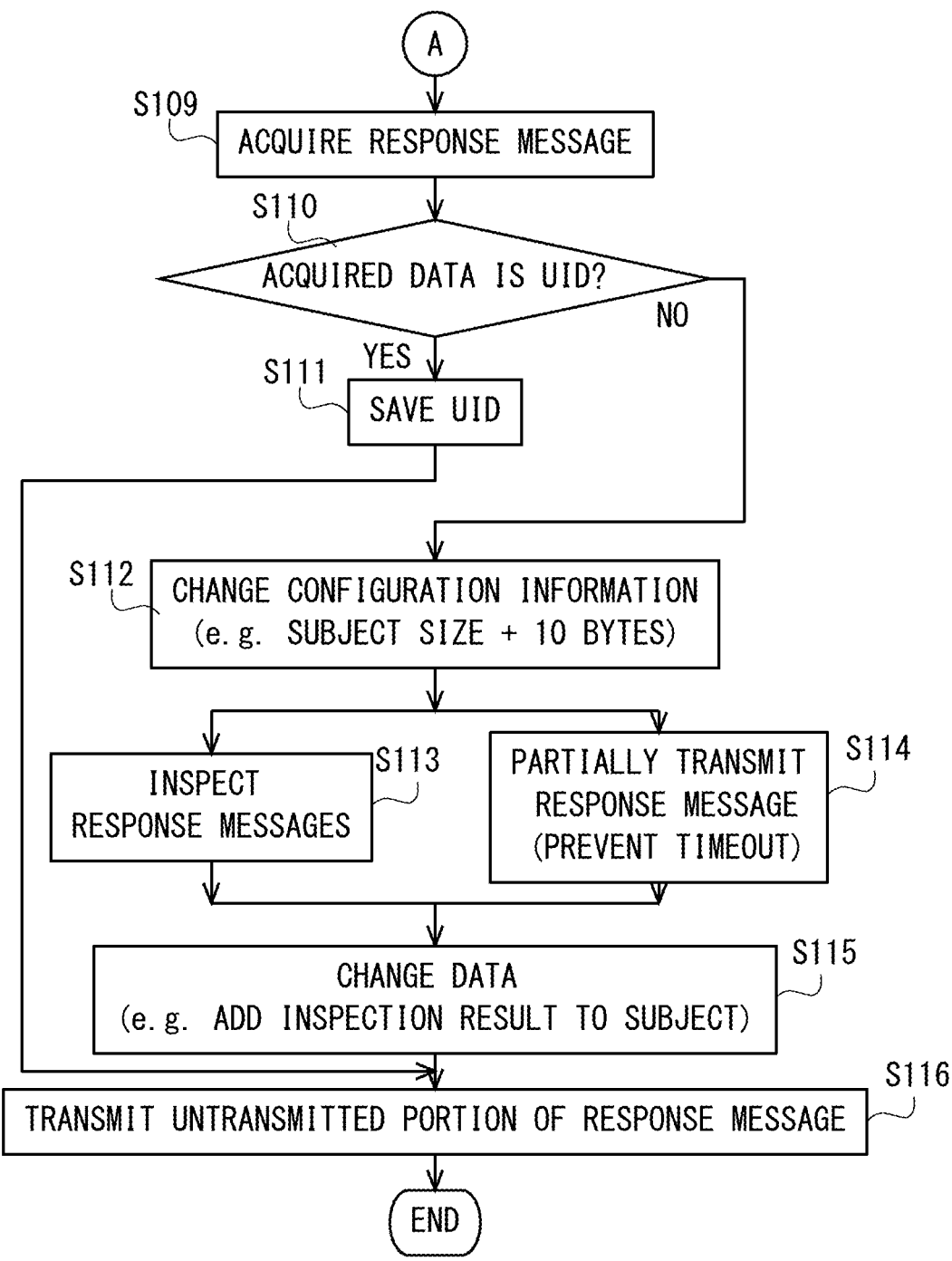
FIG. 5 is a flowchart (2) depicting a general flow of the message processing according to the embodiment.

FIG. 4 and FIG. 5 are flow charts depicting a general flow of the message processing according to this embodiment. The message processing according to this embodiment is executed at a timing when the communication inspection device 20 receives a message transmitting on the network.

In step S101, a data request message (in the case of this embodiment, a FETCH message in IMAP from the client 90 to the server) is acquired. The request acquiring unit 21 determines whether a received packet is the acquisition target by referring to the transmission source, the destination, the protocol number and the like, which are set in the header of the packet, and acquires the packet if it is an acquisition target packet, and stores the packet in the RAM 12 (hook processing). The transfer of the message acquired here is suspended until step S108. If it is determined that the packet is not an acquisition target, this packet is transferred to the destination without being acquired by the communication inspection device 20 (not included in the flow chart).

Whether the packet is the acquisition target or not is determined by collating whether the transmission source and the destination of the packet are registered in the list of the transmission source IP addresses and the destination IP addresses, which are set in advance, and whether the type of the packet is a type which is set in advance (in the case of this embodiment, a FETCH message in IMAP). To determine whether a packet is an acquisition target, a method that is different from this embodiment may be used. Then processing advances to step S102.

In step S102, it is determined whether the request target of the FETCH message is a UID only. The CPU 11 determines whether the data requested by the FETCH message acquired in step S101 is a UID only, which is an identifier unique to the data set (in the case of this embodiment, IMAP e-mail). If the requested data is a UID only, this means that the configuration information of the e-mail is not transferred to the client 90 by this request alone, and it is unnecessary to change the configuration information, hence the processing operations in steps S103 to S107 are skipped, and processing advances to step S108. If the requested data includes data other than UID, the configuration information to be transferred to the client 90 responding to this request, must be changed, hence processing advances to step S103.

In steps S103 and S104, the UID is acquired if the requested UID is not specified in the FETCH message. The identifier acquiring unit 22 determines whether a UID of the e-mail, to which the requested data belongs, is specified in the FETCH message acquired in step S101 (step S103). If the UID is specified in the FETCH message, processing advances to step S105. If the UID is not specified in the FETCH message, on the other hand, the UID of the e-mail must be acquired before acquiring the configuration information of the entire e-mail, hence the identifier acquiring unit 22 acquires the identifier of this e-mail from the server (step S104).

In concrete terms, the identifier acquiring unit 22 inquires a UID of e-mail to the server, by specifying an e-mail number indicated in the FETCH message (identifier which is effective only in the session to which this message belongs), whereby the UID of the entire e-mail, including the target data (e.g. HEADER, SUBJECT, and BODY of e-mail), is acquired. Then processing advances to step S105.

In step S105, it is determined whether the UID related to the FETCH message and the configuration information of the entire e-mail are being held. The CPU 11 determines whether the UID related to the FETCH message and the configuration of the entire e-mail indicated by this UID are being held in the communication inspection device 20, by comparing the UID specified in the FETCH message or the UID acquired in step S104 with the list of UIDs, which is held in the communication inspection device 20. If the UID of the target e-mail and the configuration information are being held, processing advances to step S108. If the UID of the target e-mail and the configuration information are not being held, on the other hand, processing advances to step S106.

In step S106, the configuration information of the entire e-mail, including the requested data, is acquired. The configuration information acquiring unit 23 acquires, from the server, the configuration information of the e-mail, including the requested data in the FETCH message acquired in step S101. At this time, the configuration information acquiring unit 23 specifies the UID of the e-mail, including the target data, and acquires the configuration information of the e-mail from the server.

The method of acquiring the configuration information of the e-mail will be described with concrete examples. In order to acquire the configuration information related to the entire e-mail, the configuration information acquiring unit 23 transmits to the server a plurality of messages to request the size information of the entire e-mail, including the e-mail header, the size information of the e-mail header, and the size information relating to the data each composing element (e.g. subject line, text) included in the main body of the e-mail. These messages are transmitted from the communication inspection device 20 to the server with specifying the UID, and the communication inspection device 20 receives the response transmitted from the server, whereby the communication inspection device 20 can acquire the configuration information of the entire e-mail related to the specified UID. The correspondence between each message that is transmitted from the communication inspection device 20 to the server to acquire the configuration information, and the content that is responded from the server, is as follows.

UID FETCH 1 RFC822.HEADER: e-mail header and size information thereof

UID FETCH 1 FULL: full information of the e-mail and size information of the e-mail UID FETCH 1 BODY[header.fields (subject)]: subject and size information thereof Then processing advances to step S107.

In step S107, the UID and the configuration information are stored. The CPU 11 stores the configuration information (size information relating to the data the header, size information relating to the data SUBJECT, size information of entire e-mail, and structure of the entire e-mail) acquired in step S106, in the RAM 13, the storage device 14 or the like, in association with the corresponding UID. The UID and the corresponding configuration information stored here are referred to in step S105, in the message processing when another FETCH message transmitted from the client 90 is received. Then processing advances to step S108.

In step S108, the FETCH message is transmitted. The request transmitting unit 24 connects to the server, which was set as the destination of the FETCH message acquired in step S101, and transmits the FETCH message acquired in step S101 to the server. In other words, the communication inspection device 20, in place of the client 90, transmits the data request to the server. In this case, the request transmitting unit 24 may transmit the FETCH message which specifies the UID specified in the FETCH message acquired in step S101, the UID acquired in step S104, or the UID held in the communication inspection device 20. The request transmitting unit 24 may transfer the message received in step S101 directly to the server, or may transmit the message received in step S101 to the server after converting the transmission source IP address into the IP address of the communication inspection device 20 if necessary. Then processing advances to step S109.

In step S109, the data transmitted from the server is received. The response acquiring unit 25 acquires the response message including the data and the configuration information relating to the data, which was transmitted from the server as the response message to the FETCH message transmitted in step S108, before this response message reaches the client 90. At this point, the communication inspection device 20 does not transmit the data, related to the request by the client 90, to the client 90. The response message may be acquired as a plurality of packets, but the inspecting unit 27 may start inspection of the data included in the response message, before all the plurality of packets are received. Then processing advances to step S110.

If the data acquired by the FETCH message is the UID only, the acquired UID is stored in the steps S110 and S111. The description of the specific content of the determination in step S110, which is the same as step S102, will be omitted. If the data acquired in step S108 is the UID only, the CPU 11 stores this UID in the RAM 13, the storage device 14 or the like (step S111). The UID stored here is referred to in step S105 when another FETCH message transmitted from the client 90 is received.

Further, if the acquired data is the UID only, the inspection is unnecessary, hence the processing operations in steps S112 to S115 are skipped, and processing advances to step S116. If the acquired data includes data other than the UID, on the other hand, the data received as the response must be inspected, hence processing advances to step S112.

In step S112, the configuration information is changed. The configuration information changing unit 26 changes the configuration information of the entire e-mail acquired in step S106 and the configuration information relating to the data acquired in step S109, with consistency thereof being maintained. In the example of this embodiment, the configuration information changing unit 26 makes a change to increase the size information relating to the subject line of the e-mail, in the configuration information of the entire e-mail, by a predetermined amount (e.g. 10 bytes). According to this, the configuration information changing unit 26 makes a change to adjust the configuration information of the entire e-mail, to match up with the increase in the size information relating to the subject line. In concrete terms, the configuration information changing unit 26 makes a change to increase the size information of the entire e-mail by a predetermined amount (e.g. 10 bytes). Then processing advances to step S113 and step S114.

In step S113, the received data is inspected. The inspecting unit 27 inspects whether the data acquired in step S109 has content of which transfer to the client 90 is allowed, in accordance with the predetermined inspection items. The inspection result is stored in the RAM 13, the storage device 14 or the like, in association with the corresponding UID. Then processing advances to step S115.

In step S114, a part of the response message is transmitted. While the inspection is being performed in step S113, the data transmitting unit 29 transmits at least a part of the configuration information or data after the change to the client 90. The processing of transmitting a part of the configuration information/data in this step is repeated until the inspection ends at intervals which does not cause timeout of the data reception wait time in the client 90. In this case, the size information relating to the data is included in the configuration information which is transmitted during the inspection, but the size information has already been changed in step S112, therefore this configuration information can be transmitted to the client without problems. When the inspection ends, processing advances to step S115.

To be more specific, the data transmitting unit 29 extracts, from the changed configuration information, a predetermined number of bytes or a predetermined number of lines at a time sequentially from the beginning, and transmits the extracted configuration information at each predetermined timing. By performing this processing, a timeout of the data wait time in the client 90 during the inspection of the data can be prevented. For example, in some clients 90, the data wait time is reset every time one line of data is received. In other words, the data wait time is not reset until a line feed code is received, hence the data transmitting unit 29 transmits at least one line of the response message at a time during the inspection.

When the inspection takes a long time, the size of data to transmit to prevent a timeout may become insufficient if only the configuration information is transmitted. In this case, the data transmitting unit 29 may sequentially transmit the inspected data body little by little, or configuration information which does not determine the content to be received by the destination (e.g. an e-mail header, of which name starts with "X-" and which can be freely added, hereafter called "X header"), may be newly generated and transmitted. In the case of adding the X header to the configuration information, however, the configuration information must be changed in advance in step S112 in accordance with the size of the X header to be added. In this case, after the response message, including the configuration information and the data, is acquired in step S109, it is preferable to calculate the time required for inspection based on the size of the acquired configuration information and data and the processing capacity of the inspecting unit 27, and calculate the size of the X header to be generated in accordance with the required inspection time.

In step S115, the data body is changed. The data changing unit 28 changes the data in accordance with the inspection result acquired by the inspecting unit 27. In concrete terms, the data changing unit 28 changes the subject line of the e-mail in order to notify the inspection result to the user.

In this embodiment, a change is made to increase the size information by a predetermined amount (in this description, this is assumed to be 10 bytes). Therefore if it is determined that an e-mail is phishing e-mail as a result of the inspection, the subject line is changed by adding a 10 byte "[PHISHING]" character string. And if it is determined that an e-mail is spam e-mail, the subject line is changed by adding a 10 byte character string constituted by a 6 byte character string "[SPAM]" and 4 bytes of blank spaces. Since the size information relating to the subject line data is increased by 10 bytes in step S112, this changed data is used as the configuration information relating to the data transmitted with this UID to the client 90 hereafter, thereby the information can be added without generating inconsistency in the configuration information of the entire e-mail in the client 90. Even if the inspection result indicates that the data has no problems and may be transmitted directly to the client 90, 10 bytes of blank spaces are added to the subject line, since 10 bytes have already been added in the configuration information.

The data changing unit 28 may change the e-mail header to notify the inspection result to the user. For example, in the case of the e-mail header, a more detailed inspection result may be added using an X header, which can be freely added, such as "X-SPAM-CORE: 111/222 Rating 5" (this X header is an example when the spam probability point is 111 out of a threshold of 222, and risk degree is 5). In this case, the size information of the e-mail header is increased by a required number of bytes in advance in step S112.

When the inspection result indicates that the data is harmful data of which transfer to the client 90 is not allowed, the data changing unit 28 may make a change so that this data becomes harmless. For example, the data changing unit 28 can make the data harmless by replacing a part or all of the data with data which the client 90 is allowed to receive. Then processing advances to step S116.

In step S116, an untransmitted portion of the response message is transmitted to the client 90. The data transmitting unit 29 transmits, to the client 90, the response message for responding to the FETCH message acquired in step S101, which the client 90 transmitted to the server.

If the request target of the FETCH message is UID (YES in step S110), the data transmitting unit 29 transmits the UID directly to the client as the response message.

If the request target of the FETCH message includes data other than the UID, then the data transmitting unit 29 transmits, to the client, the data, which was changed in step S115, and an untransmitted portion of the response message, including the configuration information relating to the data this data, which was changed in step S112 (that is, a response message, excluding the portion already transmitted in step S114). Then the processing operations in this flow chart complete.

FIG. 6 is a diagram depicting a flow of communication when the message processing described above is executed according to this embodiment. When the client transmits a data request message (FETCH 1 BODY), the communication inspection device 20 acquires this message (step S101), and acquires the configuration information of the entire e-mail from the server, that is, the UID, e-mail header size information, e-mail size information, and SUBJECT size information of the target e-mail (step S106).

When the configuration information of the entire e-mail is acquired, the communication inspection device 20 transmits, to the server, a data request message to acquire the data requested by the client (FETCH 1 BODY) (step S108). When the requested data and the configuration information are received from the server, the communication inspection device 20 starts inspection (step S113), and transmits the changed configuration information little by little during the inspection, so as to prevent a session timeout in the client (step S114). The configuration information which is transmitted here is the configuration information which was changed (step S112). When the inspection ends, the communication inspection device 20 transmits the data, which was changed in accordance with the inspection result (step S115), to the client, along with the untransmitted portion of the configuration information (step S116).

In this embodiment, a case of applying this disclosure to IMAP was described, but a protocol to which this disclosure can be applied is not limited to the disclosures of this embodiment. The present disclosure can be applied to protocols in general in which information to determine the configuration of the data is transmitted/received along with the data.

What is claimed is:

1. A method for causing a computer to execute:
   acquiring a data request message transmitted from a client to a server;
   acquiring, from the server, configuration information relating to a data set including a target data requested by the data request message;
   acquiring, in place of the client, a response message transmitted from the server and includes data and configuration information relating to the data;
   changing the configuration information relating to the data set and the configuration information relating to the data, with consistency therebetween being maintained;
   inspecting the data;
   changing the data in accordance with an inspection result acquired by the inspecting, so as to match the configuration information relating to the data after the change performed in the configuration information changing; and
   transmitting, to the client, a response message including the data after the change performed in the data changing and the configuration information relating to the data after the change performed in the configuration information changing, as a response to the data request message transmitted from the client to the server,
   wherein the transmitting involves transmission to the client at least a part of the configuration information after the change while the inspecting, and transmission to the client an untransmitted portion of the configuration information after the inspecting has completed the inspection of the data.

2. A computer-readable non-transitory medium on which is recorded a program causing a computer to function as:
   a request acquiring unit that acquires a data request message transmitted from a client to a server;
   a configuration information acquiring unit that acquires, from the server, configuration information relating to a data set including a target data requested by the data request message;
   a response acquiring unit that acquires, in place of the client a response message transmitted from the server and including data and configuration information relating to the data;
   a configuration information changing unit that changes the configuration information relating to the data set and configuration information relating to the data, with consistency therebetween being maintained;
   an inspecting unit that inspects the data;
   a data changing unit that changes the data in accordance with an inspection result acquired by the inspecting unit, so as to match the configuration information relating to the data after the change performed by the configuration information changing unit; and
   a data transmitting unit that transmits, to the client, a response message including the data after the change performed by the data changing unit and the configuration information relating to the data after the change by the configuration information changing unit, as a response to the data request message transmitted from the client to the server,
   wherein the data transmitting unit transmits to the client at least a part of the configuration information after the change while the inspecting unit is performing inspection, and transmits to the client an untransmitted portion of the configuration information after the inspecting unit has completed the inspection of the data.

3. An information processing apparatus, comprising:
   processing circuitry configured to operate as:
   a request acquiring unit that acquires a data request message transmitted from a client to a server;
   a configuration information acquiring unit that acquires, from the server, configuration information relating to a data set including a target data requested by the data request message;
   a response acquiring unit that acquires, in place of the client, a response message transmitted from the server and including data and configuration information relating to the data;
   a configuration information changing unit that changes the configuration information relating to the data set and configuration information relating to the data, with consistency therebetween being maintained;
   an inspecting unit that inspects the data;
   a data changing unit that changes the data in accordance with an inspection result acquired by the inspecting unit, so as to match the configuration information relating to the data after the change performed by the configuration information changing unit; and
   a data transmitting unit that transmits, to the client, a response message including the data after the change performed by the data changing unit and the configuration information relating to the data after the change performed by the configuration information changing unit, as a response to the data request message transmitted from the client to the server,
   wherein the data transmitting unit transmits to the client at least a part of the configuration information after the change while the inspecting unit is performing inspection, and transmits to the client an untransmitted portion of the configuration information after the inspecting unit has completed the inspection of the data.

4. The information processing apparatus according to claim 3, wherein
   from among the configuration information relating to the data, the configuration information changing unit makes a change to increase size information relating to the data, and further makes a change to adjust the configuration information relating to the data set in accordance with the increased size information relating to the data.

5. The information processing apparatus according to claim 4, wherein
   the data changing unit makes a change to add information to the data by the size, which the configuration information changing unit has increased.

6. The information processing apparatus according to claim 3, wherein
   the data changing unit makes a change to add information for notifying a user of the inspection result, acquired by the inspecting unit, to the data.

7. The information processing apparatus according to claim 3, wherein
   the inspecting unit inspects whether the data is allowed to transfer to the client, and
   when the inspection result acquired by the inspecting unit is that the data is not allowed to transfer to the client, the data changing unit makes a change to replace the data with data which the client may receive.

8. The information processing apparatus according to claim 3, wherein the processing circuitry is further configured to operate as a request transmitting unit which, after the request acquiring unit acquires a data request message transmitted from a client to a server, transmits in place of the client the data request message to the server, wherein
   the response acquiring unit acquires a response message transmitted from the server in response to the data request message transmitted by the request transmitting unit.

9. The information processing apparatus according to claim 3, wherein
   the configuration information acquiring unit specifies an identifier unique to a data set including target data, and acquires the configuration information relating to the data set from the server.

10. The information processing apparatus according to claim 9, wherein the processing circuitry is further configured to operate as an identifier acquiring unit that, when the data request message is a message which does not specify an identifier of a data set including requested target data, acquires the identifier of the data set from the server, wherein
    the configuration information acquiring unit specifies the identifier acquired by the identifier acquiring unit, and acquires the configuration information relating to the data set from the server.

11. The information processing apparatus according to claim 3, wherein
    the data transmitting unit transmits to the client at least a part of the configuration information after the change at intervals which do not cause a timeout of data reception wait time in the client.

* * * * *